(12) United States Patent  
Zhao et al.

(10) Patent No.: US 9,124,674 B2  
(45) Date of Patent: Sep. 1, 2015

(54) SYSTEMS AND METHODS FOR CONNECTION POOLING FOR VIDEO STREAMING IN CONTENT DELIVERY NETWORKS

(71) Applicant: FutureWei Technologies, Inc., Plano, TX (US)

(72) Inventors: Miao Zhao, Bedminster, NJ (US); Mingquan Wu, Princeton Junction, NJ (US); Hong Heather Yu, West Windsor, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 333 days.

(21) Appl. No.: 13/691,970

(22) Filed: Dec. 3, 2012

(65) Prior Publication Data

US 2013/0144984 A1    Jun. 6, 2013

Related U.S. Application Data

(60) Provisional application No. 61/565,746, filed on Dec. 1, 2011.

(51) Int. Cl.
*G06F 15/16* (2006.01)
*H04L 29/06* (2006.01)
*H04N 21/2225* (2011.01)
(Continued)

(52) U.S. Cl.
CPC .......... *H04L 65/608* (2013.01); *H04L 65/4084* (2013.01); *H04N 21/2183* (2013.01); *H04N 21/2225* (2013.01); *H04N 21/6377* (2013.01)

(58) Field of Classification Search
CPC ............ H04L 65/608; H04L 29/06469; H04L 65/4084; H04N 21/2225; H04H 20/63
See application file for complete search history.

(56) References Cited

U.S. PATENT DOCUMENTS

| 7,299,291 | B1 * | 11/2007 | Shaw | ............................ | 709/231 |
| 2003/0174648 | A1 * | 9/2003 | Wang et al. | ................... | 370/235 |
| 2004/0088413 | A1 |  | 5/2004 | Bhogi et al. | |

(Continued)

FOREIGN PATENT DOCUMENTS

| WO | 0176192 A2 | 10/2001 |
| WO | 2011038013 A2 | 3/2011 |

OTHER PUBLICATIONS

International Search Report, Application No. PCT/US2012/067599, Mailed Feb. 11, 2013, 2 pages.

(Continued)

*Primary Examiner* — Yves Dalencourt  
(74) *Attorney, Agent, or Firm* — Slater & Matsil, L.L.P.

(57) ABSTRACT

System and methods for connection pooling for video streaming in content delivery networks (CSNs) are provided. An embodiment method for connection pooling in a content delivery network (CDN) by a proxy server includes receiving, from a client, a request for media content, sending, to a control server, a query to locate an origin media server having the media content if the media content is cache-missing, receiving, from the control server, information regarding the origin media server having the media content requested by the client, and forwarding the request for the media content to the origin media server having the media content using a reusable connection from a pool of the reusable connections between the proxy server and the origin media server if the reusable connection is unoccupied.

24 Claims, 8 Drawing Sheets

(51) Int. Cl.
*H04N 21/6377* (2011.01)
*H04N 21/2183* (2011.01)

(56) References Cited

U.S. PATENT DOCUMENTS

2007/0050522 A1 3/2007 Grove et al.
2007/0245409 A1 10/2007 Harris et al.
2012/0089700 A1 4/2012 Safruti et al.

OTHER PUBLICATIONS

Written Opinion of the International Searching Authority, Application No. PCT/US2012/067599, Mailed Feb. 11, 2013, 7 pages.

* cited by examiner

SYSTEMS AND METHODS FOR CONNECTION POOLING FOR VIDEO STREAMING IN CONTENT DELIVERY NETWORKS

CROSS-REFERENCE TO RELATED APPLICATIONS

This application claims the benefit of U.S. Provisional Application No. 61/565,746, filed on Dec. 1, 2011, entitled "Systems and Methods for Connection Pooling for Video Streaming in Content Delivery Networks," which application is hereby incorporated herein by reference.

TECHNICAL FIELD

The present disclosure relates to systems and methods for video streaming and, in particular embodiments, to systems and methods for connection pooling for video streaming in content delivery networks.

BACKGROUND

Recent years have witnessed the proliferation of content delivery networks (CDNs) on the Internet for a wide range of applications, including web object hosting, file/document dissemination, multimedia streaming, etc. Among these applications, video streaming is recently becoming increasingly popular on CDNs, and incurs large volumes of data to be exchanged between the edge proxy and origin media servers. Fully utilizing the network resources to stream video in a timely and smooth manner is now attracting extensive studies and efforts.

Currently, the streaming media industry has experienced a steady shift away from classic streaming protocols, such as real time streaming protocol (RTSP), back to plain hypertext transfer protocol (HTTP) download, such as Microsoft IIS Smooth Streaming and Apple HTTP Live Streaming. The video content is typically stored in full length as a single file on the media server (one file per encoded bit rate for adaptive streaming) and is transmitted to the client as a series of small chunk files over HTTP. As player clients request each video time slice from the media server sequentially and separately, the transmission control protocol (TCP) connections between the proxy and origin servers, which are dedicated to respective requests for particular data from different clients, are frequently and repeatedly setup and torn down. For example, a 900 MB video leads to at least 3600 times of TCP connection establishment with a 250 KB chunk size, to say nothing of HD video with a typical size of several gigabytes. As TCP connection establishment is a tedious task, this generally makes the access slow and eventually impacts the video fluency.

SUMMARY

An embodiment method for connection pooling in a content delivery network (CDN) by a proxy server includes receiving, from a client, a request for media content, sending, to a control server, a query to locate an origin media server having the media content if the media content is cache-missing, receiving, from the control server, information regarding the origin media server having the media content requested by the client, and forwarding the request for the media content to the origin media server having the media content using a first reusable connection from a pool of the reusable connections between the proxy server and the origin media server if the reusable connection is unoccupied.

An embodiment method for connection pooling in a content delivery network (CDN) by a proxy server includes receiving, from a client, a request for media content, sending, to a control server, a query to locate an origin media server having the media content if the media content is cache-missing, receiving, from the control server, information regarding the origin media server having the media content requested by the client, and redirecting, to a caching server, the request for media content if a bandwidth of a reusable connection from a pool of the reusable connections between the proxy server and the origin media server is below a threshold and a reusable connection from a pool of the reusable connections between the caching server and the origin media server is unoccupied.

An embodiment method for connection pooling in a content delivery network (CDN) by a caching server includes receiving, from a proxy server, a request for media content, determining that the media content is cache-missing, and forwarding, to an origin media server, the request for the media content using a reusable connection from a pool of the reusable connections between the caching server and the origin media server.

An embodiment proxy server in a content delivery network (CDN) includes a client network interface configured to receive a request for media content from a client, a processor operably coupled to the client network interface, the processor configured to determine that the media content is cache-missing, a control server network interface operably coupled to the processor, the control server network interface configured to send a query to a control server to locate an origin media server having the media content if the media content is cache-missing and to receive information from the control server regarding the origin media server having the media content, and an origin media server network interface operably coupled to the processor, the origin media server network interface configured to forward the request for the media content to the origin media server having the media content using a reusable connection from a pool of reusable connections between the proxy server and the origin media server if the reusable connection is unoccupied.

An embodiment caching server in a content delivery network (CDN) includes a proxy server network interface configured to receive a request for media content from a proxy server, a processor operably coupled to the proxy server network interface, the processor configured to determine that the media content is cache-missing, and an origin media server network interface operably coupled to the processor, the origin media server network interface configured to forward the request for the media content to an origin media server using a reusable connection from a pool of the reusable connections between the caching server and the origin media server.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely servers within a content delivery network (CDN). The concepts in the disclosure may also apply, however, to other types of devices and other types of networks or communications systems with other components.

Figure 1:
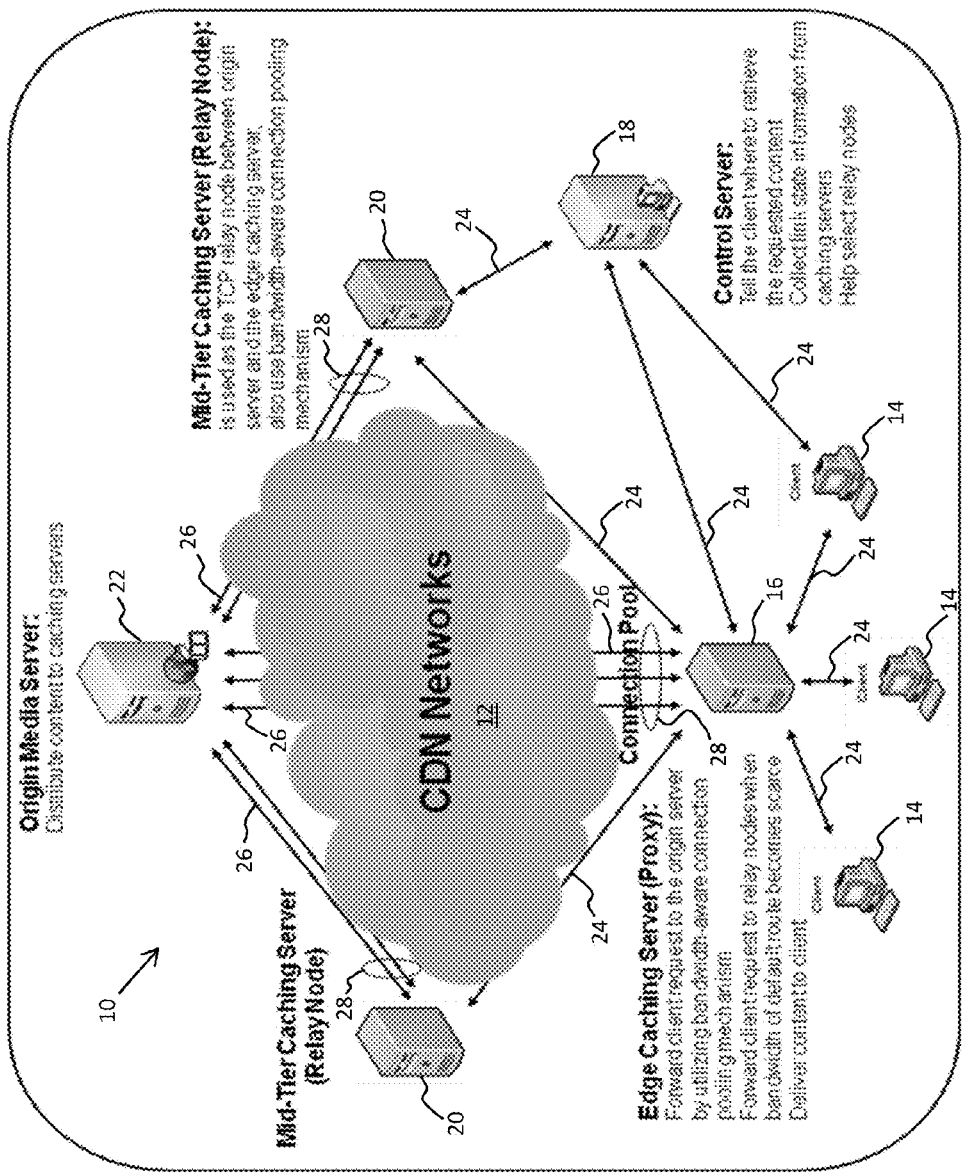
FIG. 1 illustrates a system architecture of CDN networks with bandwidth-aware connection pooling.

Referring now to FIG. 1, an embodiment system architecture 10 of content delivery networks (CDNs) 12 is illustrated. As shown, the embodiment system architecture 10 generally includes clients 14, an edge caching server (a.k.a., proxy server) 16, a control server 18, mid-tier caching servers (a.k.a., relay nodes) 20, and an origin media server 22. As will be more fully explained below, these devices communicate through, or provide information for communications through, the content delivery networks 12 using a connection 24 or one or more of the reusable connections 26 in a connection pool 28.

It should be recognized that the embodiment system architecture 10 may include components, devices, hardware, and so on, which have not been included in FIG. 1 for ease of illustration. In addition, it should be recognized that the embodiment system architecture 10 may also include, for example, more or fewer clients 14 and caching servers 20 and more of the proxy servers 16, control servers 18, and origin media servers 22.

In general, the embodiment system architecture 10 provides a connection management mechanism to tune to the requirements of video streaming applications. Indeed, and as will be more fully explained below, the embodiment system architecture 10 includes a bandwidth-aware connection pooling mechanism for video streaming applications in the content delivery networks 12. The embodiment system architecture 10 also includes a novel relay node selection scheme and relay determination algorithm.

Connection pooling is a technology that maintains transmission control protocol (TCP) connections so that the reusable connections 26 can be reused when future requests to a server (e.g., origin media server 22) are desired. Connection pooling effectively improves network performance by avoiding frequent and costly connection setup and disconnecting processes. The reusable connections 26 are intelligently maintained and managed between the proxy server 16 and the origin media server 22 in order to support substantial requests from the clients 14. When the number of reusable connections 26 in use between the proxy server 16 and the origin media server 22 becomes large, which implies each reusable connection 26 can share limited bandwidth, the control server 18 helps select the optimal caching server 20 to supplement the available bandwidth. As shown in FIG. 1, each of the caching servers 20 also maintains some reusable connections 26 to the origin media server 22 in connection pools 28.

An embodiment includes a bandwidth-aware connection pooling mechanism that integrates TCP connection management and the application-layer TCP relay for fast media access and delivery. An embodiment includes a relay node selection scheme and a relay determination algorithm. An embodiment jointly considers a transport-layer connection pooling technique and an application-layer relay scheme. Embodiments may be applied to video/audio transport, file transport, data transfer, transport network, CDNs, and the like.

As shown in FIG. 1, an embodiment maintains the connection pool 28 of reusable connection 26 instances between the proxy server 16 and the origin media server 22 to make the access faster. In particular, the reusable connection 26 between the proxy server 16 and the origin media server 22 is created when needed. After its use is completed, the reusable connection 26 is returned to the connection pool 28 for reuse at a later point of time when another client request arrives. In this way, most client requests do not incur the overhead of creating a new connection because the proxy server 16 may locate and use an existing reusable connection 26 from the connection pool 28.

As the size of the connection pool 28 increases along with the possibility of substantial client 14 requests arriving simultaneously, however, each reusable connection 26 then shares limited bandwidth. Under these circumstances, simple connection pooling may not be sufficient to fully support the client requests. To this end, an embodiment bandwidth-aware connection pooling mechanism achieves fast access and high-bandwidth data transport. Specifically, when the bandwidth sharing among the reusable connections 26 at the proxy server 16 is reduced to a certain level or threshold, an optimal caching server 20 (a.k.a., relay node) is selected to help relay the data between the proxy server 16 and the origin media server 22, which virtually supplements the available bandwidth to satisfy more client 14 requests.

As shown in FIG. 1, each caching server 20 maintains one of the connection pools 28 with reusable connections 26 to the media server. The relay operation can thus be efficiently executed. An embodiment jointly integrates transport layer connection management and application layer data relay scheme to accelerate the data transfer for media streaming.

Embodiments of a bandwidth-aware connection pooling mechanism are discussed below in conjunction with FIGS. 1 and 2. When a player client 14 intends to request certain video content, the client 14 first consults with the control server 18. The control server 18 informs the client 14 the proxy server 16 that can be associated with to retrieve the requested content. Upon receiving the request from the client 14, the proxy server 16 checks itself to see whether the content is locally cached or cache-missing. If the proxy server 16 has the content, the proxy server 16 just serves the client 14 directly. Otherwise, the proxy server 16 finds the origin media server 22 by sending a query to the control server 18. The control server 18 makes a source selection and informs the proxy server 16 about the information for the remote origin media server 22. Along with the origin media server 22 information, the control server 18 also provides the proxy server 16 with information relating to a selected mid-tier caching server 18 (for use as a relay node) based on certain principles and criteria, which may be utilized by the proxy server 16 in the subsequent phases.

After obtaining the source information, the proxy server 16 determines how to accept the request from the client 14 and quickly access the origin media server 22. The proxy server 16 first investigates the number of reusable connections 26 in the connection pool 28 between the proxy server 16 and the origin media server 22 and the number of reusable connections 26 currently in use. Then the proxy server 16 determines whether a caching server 20 is needed or not to accommodate the request from the client 14. For the simpler case where no caching server 20 is needed, the proxy server 16 locates a reusable connection 26 from the connection pool 28 to forward the client 14 request to the origin media server 22. In the typically-infrequent case where all the reusable connections 26 in the connection pool 28 are currently occupied, the proxy server 16 is able to raise a new reusable connection 26 to the origin media server 22. For the more complicated case where the caching server 20 is employed, the proxy server 16 redirects the client 14 request to the caching server 20.

If the requested content is also cache-missing on the caching server 20, the caching server 20 locates a reusable connection 26 in its own connection pool 28 or sets up a new reusable connection 26 to the origin media server 22. In this way, instead of setting up an end-to-end connection between the proxy server 16 and origin media server 22, an application-layer relay helps fully utilize the connection resources. In an embodiment, the caching server 20 is able to function as a proxy server (like proxy server 16) for other client requests. Therefore, the caching server 20 is capable of determining whether the incoming request is directly from a client 14 asking for access or from the proxy server 16 asking for relay.

From the above, it can be seen that attempts are made to use the existing available reusable connections 26 for fast access. The reusable connections 26 from the connection pool that the proxy server 28 itself holds are not the only ones that may be used. Indeed, help from the connection pool 28 of a carefully selected caching server 20 may be extracted. Moreover, as the caching server 20 helps accommodate more requests and re-routes the streaming in diversified paths, more throughput can be achieved and a smoother end user experience can be achieved for the client 14.

Several aspects of an embodiment bandwidth-aware connection pooling mechanism are discussed below, including caching server 20 (i.e., relay node) selection, relay determination, and connection pool management.

For caching server 20 selection, the control server 18 determines how to select an optimal caching server 20 for a proxy server 16. Different from the traditional relay selection that focuses on available bandwidth only, an embodiment jointly considers the available bandwidth along with the available reusable connections 26 in the connection pool 28 maintained by the caching server 20 connecting to the origin media server 22. For example, assume there is a set of candidate caching servers 20 all with available connections to help relay traffic for each proxy server 16. The control server 18 chooses an optimal caching server 20 from the candidate set based on the information periodically gathered from the caching servers 20. The optimality principle can be defined, for example, as selecting the caching server 20 with the maximum weighted sum of available end-to-end bandwidth and the number of idle reusable connections 26 in the connection pool 28 between the particular caching server 20 and the origin media server 22.

Relay determination determines whether the proxy server 16 needs help from the caching server 20 or not based on a relay determination principle. For example, relay determination principle comprises a relay determination algorithm as mentioned in the following section which guarantees the minimum bandwidth each connection can share and tries to utilize high-bandwidth transfer if possible. A maximum number of reusable connections 26 in the connection pool 28 for each caching server 20 is set, which is the bound to ensure that each request from the client 14 is able to use a certain amount of bandwidth if accepted for access. The proxy server 16 generally uses its resources first before resorting to help from the caching server 20 in order to minimize additional overhead. When there are idle reusable connections 26 in its own connection pool 28, the proxy server 16 prefers to reuse them. In the case where the available bandwidth and the idle reusable connections 26 at the caching server 20 are significantly higher than those at the proxy server 16, the caching server 20 is considered for fast transfer. Details of an embodiment algorithm are described in Table 1, below.

TABLE 1

Pseudo Code of Relay Determination Algorithm

Input: M : Maximum number of connections in pool between a proxy and the server
    $W_p$, $W_r$: Available bandwidth directly from proxy or via relay node to the server
    $O_p$, $O_r$: Number of occupied connections at proxy or relay node connecting to server
    $I_p$, $I_r$: Number of idle connections at proxy or relay node connecting to server
    $\alpha_1$, $\alpha_2$: Constant weight coefficients
    $\delta$: Pre-defined threshold
Output: Employ relay (EMPLOY_RELAY) or not (NO_RELAY)
if ($O_p$ == M ) return EMPLOY_RELAY;
if ($I_p$ > 0 ) return NO_RELAY;
if ($I_r$ > 0 and $(\alpha_1 W_r + \alpha_2 I_r)/(\alpha_1 W_p) \geq \delta$) return EMPLOY_RELAY;
return NO_RELAY;

For connection pool 28 management, each proxy server 16 is responsible for the management of the connection pool 28 to the origin media server 22. In an embodiment, the proxy server 16 maintains a record list, which includes the server IP, service port number, TCP options (socket ID, IP4/IP6), connection state (idle or occupied) and other useful information of each reusable connection 26 in the connection pool 28. The record list is updated once there is a newly established reusable connection 26, connection state transit, disconnection due to error occurrence, connection termination by server side, and the like. The proxy server 16 may set a maximum number of reusable connections 26 in the connection pool 28 that can connect to the origin media server 22. The maximum number may be dynamically set based on, for example, a measurement of available bandwidth, based on an empirical value to meet application needs. The maximum number may be adjusted periodically with moderate intervals. In another embodiment, the proxy server 16 also sets a maximum bound for the number of reusable connections 26 in the connection pool 28 that can connect to the origin media server 22. This bound can be statically set as a constant based on an empirical value to meet application needs. Alternatively, it can be dynamically set based on a measurement of available bandwidth. The bound value may be adjusted periodically with moderate intervals. For example, when the available bandwidth shrinks, the bound value correspondingly decreases and the excess reusable connections 26 in the connection pool 28 are released when they are not in use.

Figure 2:
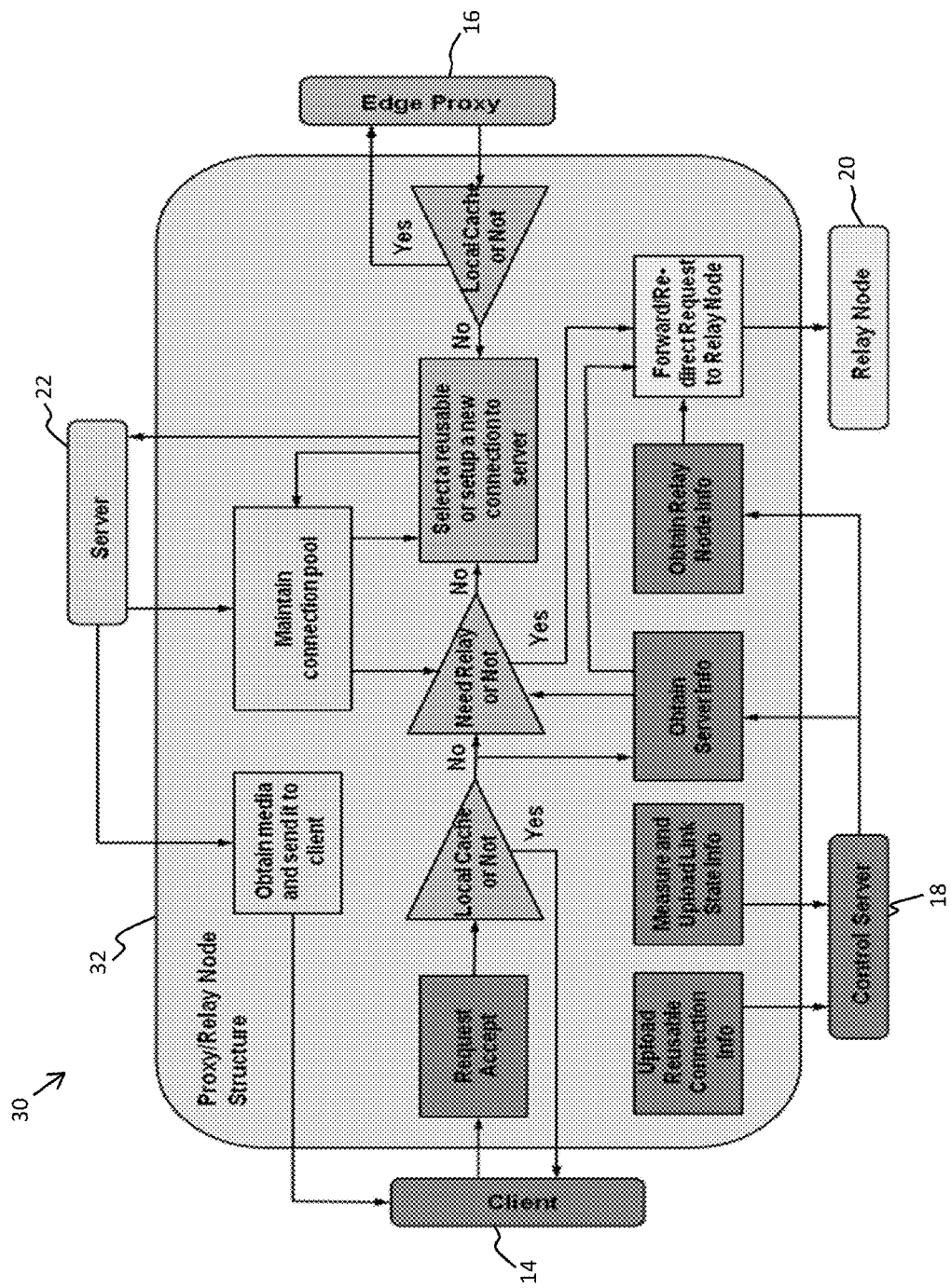
FIG. 2 illustrates a proxy structure with bandwidth-aware connection pooling.

Referring now to FIG. 2, a diagram 30 collectively illustrates some of the operations of the proxy server 16 and the caching server 20 through a proxy/relay node structure 32. Despite the collective nature of illustration, it should be noted that not all elements of the diagram 30 apply to operations of the proxy server 16 and not all elements of the diagram 30 apply to operations of the caching server 20. For instance, the proxy and the caching server may be interchangeable and/or perform some tasks traditionally performed the other. As an example, the proxy may behave as a caching server in order to relay traffic for other requests, while the caching server may behave as a proxy for its local requests. As another example, when the proxy/relay node structure 32 represents operations of the proxy server 16 in FIG. 1, the block representing proxy server 16 in FIG. 2 and the corresponding determination of whether the media content is cache missing from the proxy server 16 may be ignored. In other words, only the operations relating to the client 14, the control server 18, the origin media server 22, and the caching server 20 are applicable in such a scenario. As yet another example, when the proxy/relay node structure 32 represents operations of the caching server 20, the relay node 20 and corresponding forward/redirect request are ignored. In other words, only the operations relating to the client 14, the control server 18, the origin media server 22, and the proxy server 16 are applicable.

Figure 3:
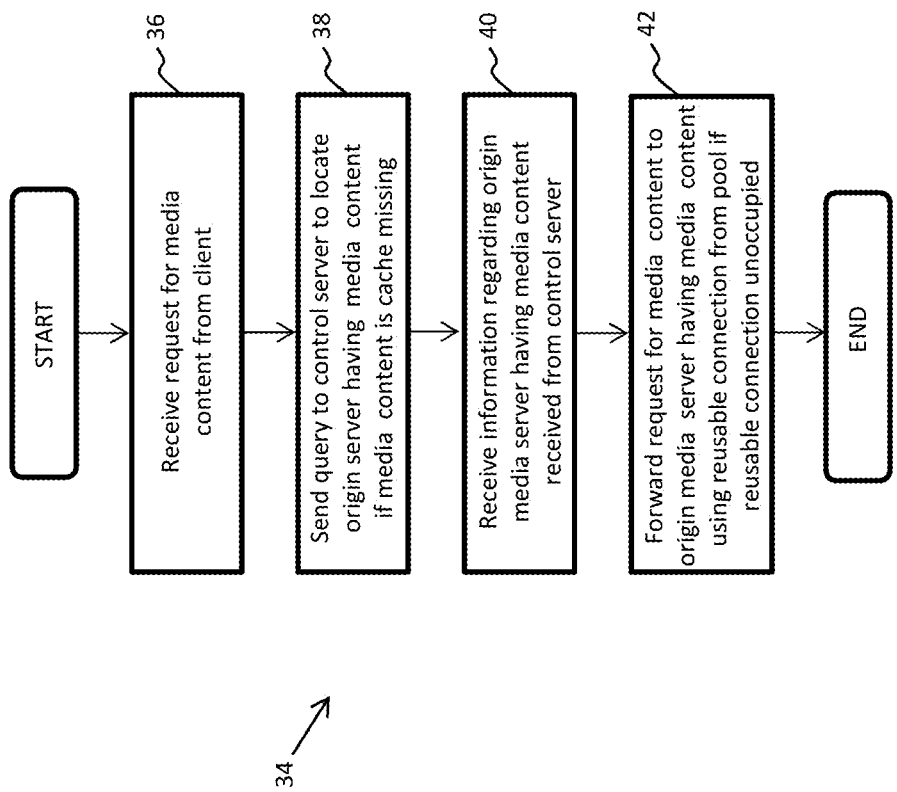
FIG. 3 illustrates an embodiment method for connection pooling in the content delivery network by the proxy server.

Referring now to FIG. 3, an embodiment method 34 for connection pooling in the content delivery network 12 by the proxy server 16 is illustrated. In block 36, a request for media content is received from the client 14. In block 38, a query to locate the origin media server 22 having the media content is sent to the control server 18 if the media content is cache-missing. In block 40, information regarding the origin media server 22 having the media content requested by the client 14 is received from the control server. In block 42, the request for the media content is forwarded to the origin media server 22 having the media content using the reusable connection 26 from the pool of the reusable connections 28 between the proxy server 16 and the origin media server 22 if the reusable connection 26 is unoccupied.

In an embodiment, a determination of whether to use the caching server 20 to accommodate the request for the media content in accordance to the bandwidth of a secondary reusable connection 26 available between the caching server 20 and the origin media server 22 is made.

Figure 4:
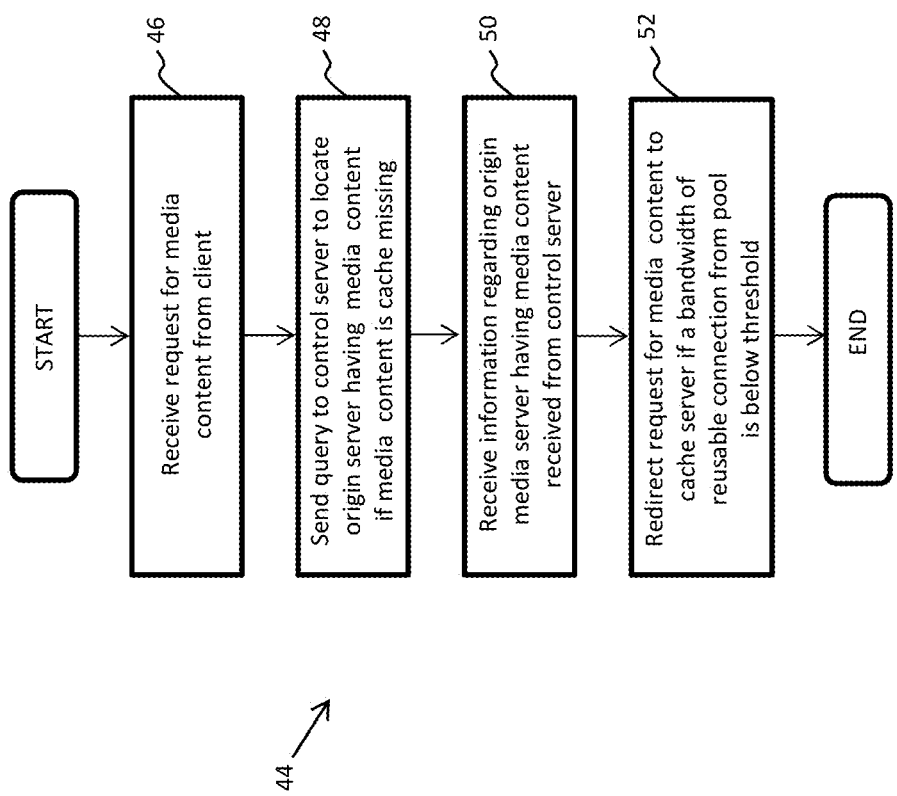
FIG. 4 illustrates an embodiment method for connection pooling in the content delivery network by the proxy server.

Referring now to FIG. 4, an embodiment method 44 for connection pooling in the content delivery network 12 by the proxy server 16 is illustrated. In block 46, a request for media content is received from the client 14. In block 48, a query to locate the origin media server 22 having the media content is sent to the control server 18 if the media content is cache-missing. In block 50, information regarding the origin media server 22 having the media content requested by the client 14 is received from the control server 18. In block 52, the request for media content is redirected to the caching server 20 if the bandwidth of a reusable connection 26 from the pool of the reusable connections 28 between the proxy server 16 and the origin media server 22 is below a threshold.

Figure 5:
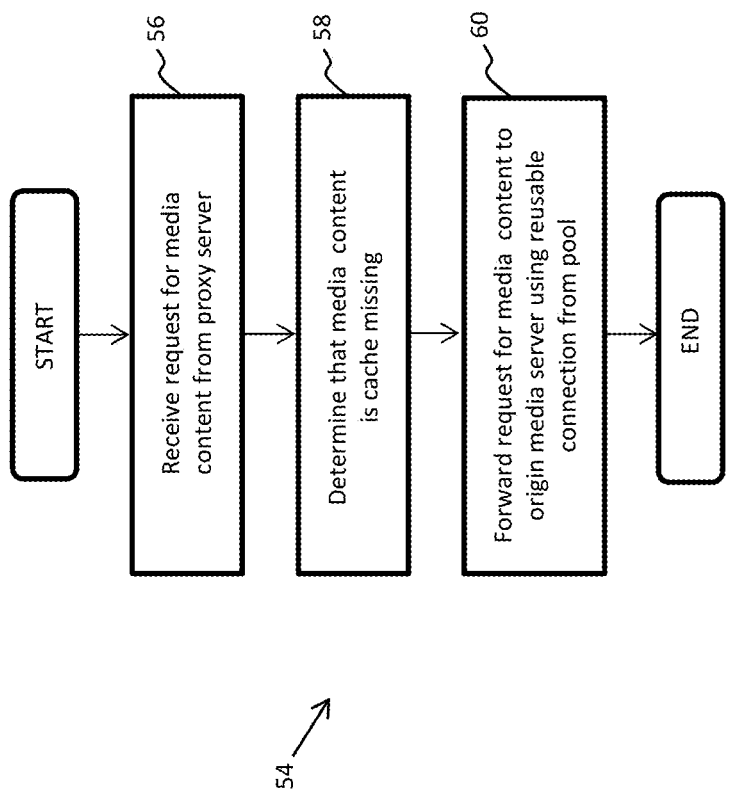
FIG. 5 illustrates an embodiment method for connection pooling in the content delivery network by the caching server.

Referring now to FIG. 5, an embodiment method 54 for connection pooling in the content delivery network 12 by the caching server 20 is illustrated. In block 56, a request for media content is received from the proxy server 16. In block 58, a determination that the media content is cache-missing is made. In block 60, the request for the media content is forwarded to the origin media server using the reusable connection 26 from the pool of the reusable connections 28 between the caching server 20 and the origin media server 22.

Figure 6:
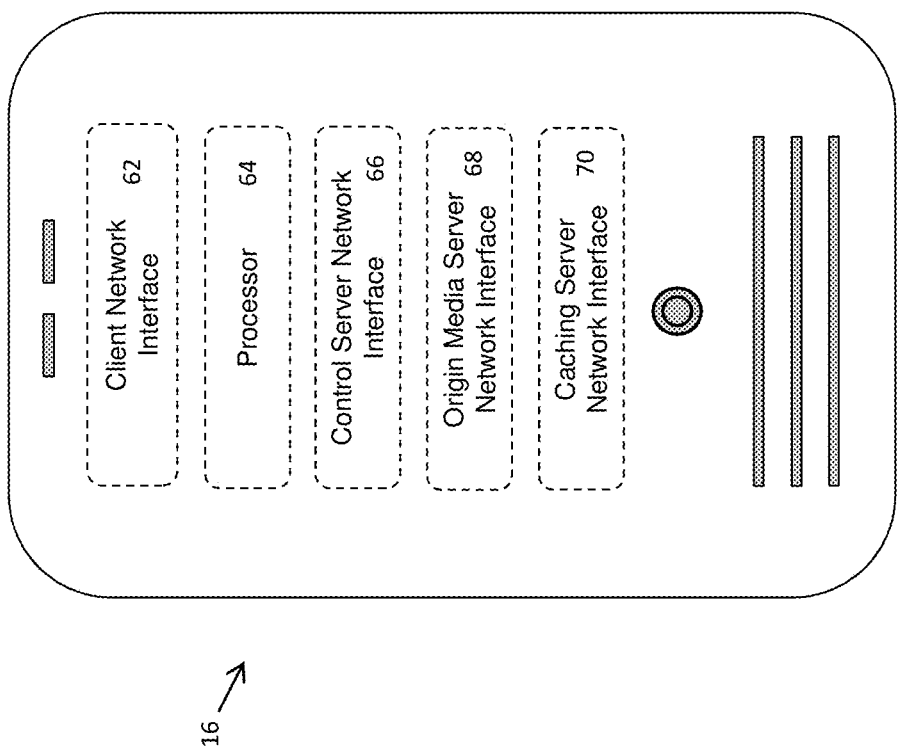
FIG. 6 illustrates an embodiment proxy server in further detail.

Referring now to FIG. 6, an embodiment proxy server 16 is illustrated in further detail. As shown, the embodiment proxy server 16 includes a client network interface 62, a processor 64, a control server network interface 66, an origin media server network interface 68, and a caching server network interface 70. The embodiment proxy server 16 may also include additional hardware and components that, for ease of illustration, have not been depicted in FIG. 2.

The client network interface 62 is configured to receive a request for media content from a client 14 in FIG. 1. The processor 64 is operably coupled to the client network interface 62 and configured to determine that the media content requested by the client 14 is cache-missing. The processor 64 is also configured to determine whether to use one of the caching servers 20 to accommodate the request for the media content in accordance a bandwidth of the reusable connections 26 in the pool of reusable connections 28. In addition, the processor 64 is configured to determine a number of the reusable connections 26 within the pool of reusable connections 28 and which of the reusable connections 26 within the pool of reusable connections 28 is currently in use.

The control server network interface 66 is operably coupled to the processor 64. The control server network interface 66 is configured to send a query to the control server 18 in FIG. 1 to locate the origin media server 22 having the media content if the media content is cache-missing. The control server network interface 66 is also configured to receive information from the control server 18 of FIG. 1 regarding the origin media server 22 having the media content. In an embodiment, the control server network interface 66 is configured to receive additional information regarding the optimal caching server 20 available to accommodate the request for media content.

The origin media server network interface 68 is operably coupled to the processor 64. The origin media server network interface 68 is configured to forward the request for the media content to the origin media server 22 of FIG. 1 having the media content. In an embodiment, the origin media network interface 68 forwards the request for the media content using one of the reusable connections 26 from the pool of reusable connections 28 between the proxy server 16 and the origin media server 22 if the reusable connection 26 is unoccupied.

The caching server network interface 70 is configured to redirect the request for media content to one of the caching servers 20 of FIG. 1 if a bandwidth of the pool of reusable connections 26 shared between the reusable connections 26 is below a threshold.

Figure 7:
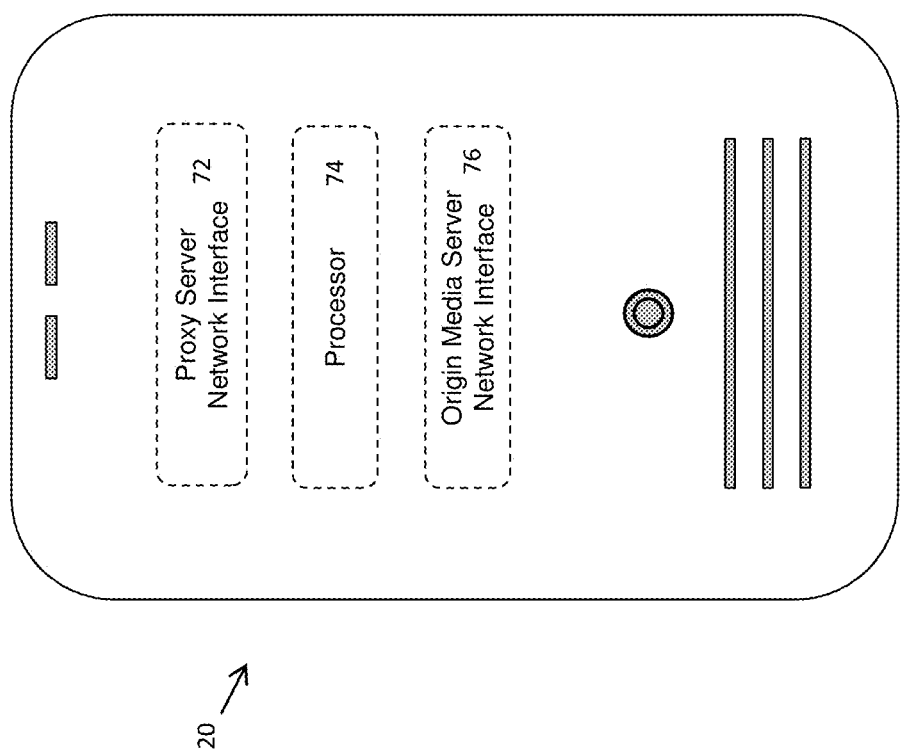
FIG. 7 illustrates an embodiment caching server in further detail.

Referring now to FIG. 7, an embodiment caching server 20 is illustrated in further detail. As shown, the caching server 20 includes a proxy server network interface 72, a processor 74, and an origin media server network interface 76. The proxy server network interface 72 is configured to receive a request for media content from the proxy server 16. In an embodiment, the proxy server network interface 72 is configured to send the media content received from the origin media server 22 to the proxy server 16.

The processor 74 is operably coupled to the proxy server network interface 72 and configured to determine that the media content is cache-missing. The origin media server network interface 76 is operably coupled to the processor 74. The origin media server network interface 76 is configured to forward the request for the media content to the origin media server 22 using a reusable connection 26 from the connection pool 28 between the caching server 20 and the origin media server 22. In an embodiment, the origin media server network interface 76 is also configured to receive the media content from the origin media server 22 through the reusable connection 26.

Figure 8:
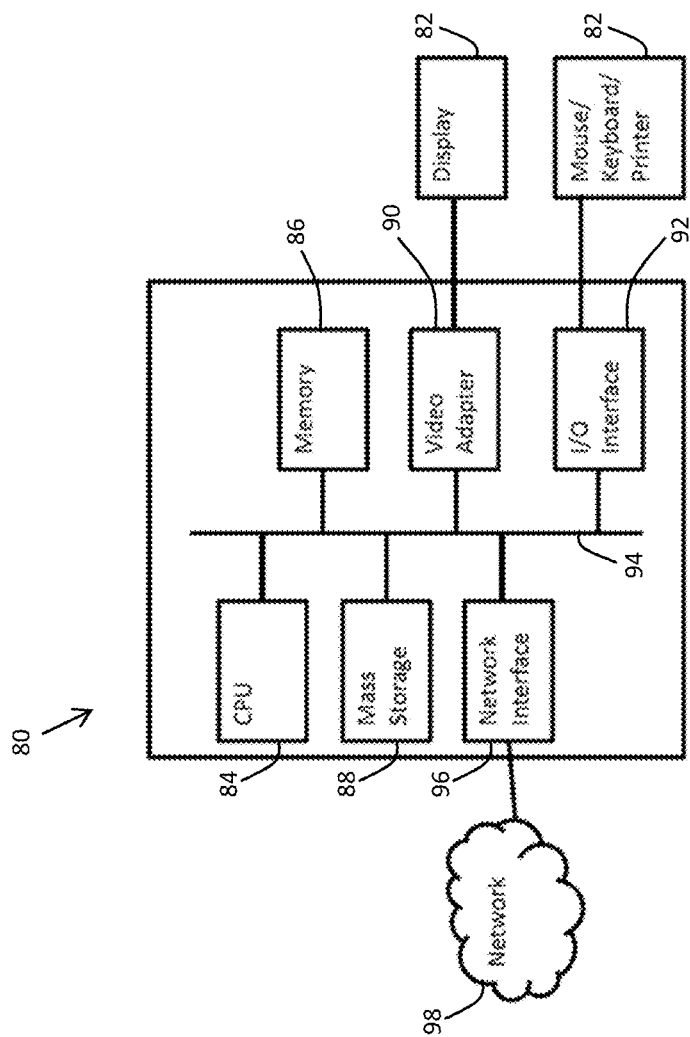
FIG. 8 is a block diagram illustrating a computing platform that may be used for implementing, for example, the devices and methods described herein, in accordance with an embodiment.

FIG. 8 is a block diagram of a processing system 80 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 80 may comprise a processing unit equipped with one or more input/output devices 82, such as a speaker, microphone, mouse, touchscreen, keypad, keyboard, printer, display, and the like. The processing system 80 may include a central processing unit (CPU) 84, memory 86, a mass storage device 88, a video adapter 90, and an I/O interface 92 connected to a bus 94.

The bus 94 may be one or more of any type of several bus architectures including a memory bus or memory controller, a peripheral bus, video bus, or the like. The CPU 84 may comprise any type of electronic data processor (e.g., processor 64 of FIG. 6 or processor 74 of FIG. 7). The memory 86 may comprise any type of system memory such as static random access memory (SRAM), dynamic random access memory (DRAM), synchronous DRAM (SDRAM), read-only memory (ROM), a combination thereof, or the like. In an embodiment, the memory 86 may include ROM for use at boot-up, and DRAM for program and data storage for use while executing programs.

The mass storage 88 device may comprise any type of storage device configured to store data, programs, and other information and to make the data, programs, and other information accessible via the bus 94. The mass storage device 88 may comprise, for example, one or more of a solid state drive, hard disk drive, a magnetic disk drive, an optical disk drive, or the like.

The video adapter 90 and the I/O interface 92 provide interfaces to couple external input and output devices to the processing unit. As illustrated, examples of input and output devices include the display coupled to the video adapter 90 and the mouse/keyboard/printer coupled to the I/O interface 92. Other devices may be coupled to the processing system 80, and additional or fewer interface cards may be utilized. For example, a serial interface such as Universal Serial Bus (USB) (not shown) may be used to provide an interface for a printer.

The processing system 80 also includes one or more network interfaces 96, which may comprise wired links, such as an Ethernet cable or the like, and/or wireless links to access nodes or different networks. The network interface 96 allows the processing system 80 to communicate with remote systems or units via the networks. For example, the network interface 96 may provide wireless communication via one or more transmitters/transmit antennas and one or more receivers/receive antennas. In an embodiment, the processing system 80 (a.k.a., processing unit) is coupled to a local-area network 98 or a wide-area network 98 for data processing and communications with remote devices, such as other processing units, the Internet, remote storage facilities, or the like.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for connection pooling in a content delivery network (CDN) by a proxy server, the method comprising:
   receiving, from a client, a request for media content;
   sending, to a control server, a query to locate an origin media server having the media content if the media content is cache-missing;
   receiving, from the control server, information regarding the origin media server having the media content requested by the client;
   determining whether to use connection pool between a proxy server and the origin media server or to use a caching server to accommodate the request for the media content;
   forwarding the request for the media content to the origin media server having the media content using a first reusable connection or a newly created connection in the connection pool between the proxy server and the origin media server if the connection pool between a proxy server and origin media server is available;
   selecting a caching server from a plurality of caching servers according to a weighted sum of available end-to-end bandwidth between each caching server and the origin media server and according to a number of idle reusable connections in a connection pool between each caching server and the origin media server if the connection pool between the proxy server and the origin media server is not available, the available end-to-end bandwidth between the proxy server and the origin server is below a first threshold, or a number of used reusable connections between the proxy server and the origin media server exceed a second threshold; and
   redirecting, to the selected caching server, the request for media content if the bandwidth of a reusable connection from a pool of the reusable connections between the proxy server and the origin media server is below a threshold and a reusable connection from a pool of the reusable connections between the caching server and the origin media server is unoccupied.

2. The method of claim 1, wherein the connection pool between a proxy server and origin media server is available when at least one reusable connection is unoccupied or a new connection can be created in accordance with a connection pool management criteria.

3. The method of claim 2, wherein the connection pool management criteria comprises a maximum number of reusable connections in the connection pool which is dynamically set to meet application needs.

4. The method of claim 2, wherein the connection pool management criteria comprises whether an amount of bandwidth available for reusable connections in the connection pool exceeds a threshold.

5. The method of claim 4, wherein the threshold is determined according to dynamical measurement of the available bandwidth for the reusable connections in the connection pool.

6. The method of claim 1, further comprising determining whether to use a caching server to accommodate the request for the media content in accordance with a bandwidth of a secondary reusable connection available between the caching server and the origin media server.

7. The method of claim 1, further comprising determining that the media content is cache-missing prior to the sending step.

8. The method of claim 1, further comprising receiving, from the control server, additional information regarding a caching server available to accommodate the request for media content.

9. The method of claim 8, further comprising receiving the information regarding the origin media server and the additional information regarding the caching server simultaneously.

10. The method of claim 3, further comprising determining a number of the reusable connections within the connection pool prior to the forwarding step.

11. The method of claim 1, further comprising determining which of the reusable connections within the connection pool is currently in use prior to the forwarding step.

12. The method of claim 1, further comprising creating a new connection in the connection pool between the proxy server and the origin media server if each of the reusable connections in the connection pool is occupied.

13. The method of claim 1, further comprising receiving, from the origin media server, the media content requested by the client through the reusable connection.

14. The method of claim 1, further comprising sending, to the client, the media content received from the origin media server.

15. A method for connection pooling in a content delivery network (CDN) by a proxy server, the method comprising:
receiving, from a client, a request for media content;
sending, to a control server, a query to locate an origin media server having the media content if the media content is cache-missing;
receiving, from the control server, information regarding the origin media server having the media content requested by the client;
selecting a caching server from a plurality of caching servers according to a weighted sum of available end-to-end bandwidth between each caching server and the origin media server and according to a number of idle reusable connections in a connection pool between each caching server and the origin media server; and
redirecting, to the selected caching server, the request for media content if the bandwidth of a reusable connection from a pool of the reusable connections between the proxy server and the origin media server is below a threshold and a reusable connection from a pool of the reusable connections between the caching server and the origin media server is unoccupied.

16. The method of claim 15, further comprising determining the bandwidth of the reusable connection prior to the redirecting step.

17. The method of claim 15, further comprising determining that the media content is cache-missing prior to the sending step.

18. The method of claim 15, further comprising receiving, from the control server, additional information regarding the caching server available to accommodate the request for the media content.

19. A proxy server in a content delivery network (CDN), comprising:
a client network interface configured to receive a request for media content from a client;
a processor operably coupled to the client network interface, the processor configured to determine that the media content is cache-missing, and determine whether to use connection pool between a proxy server and an origin media server or to use a caching server to accommodate the request for the media content, wherein the processor is further configured to select a caching server from a plurality of caching servers according to a weighted sum of available end-to-end bandwidth between each caching server and the origin media server and according to a number of idle reusable connections in a connection pool between each caching server and the origin media server if the connection pool between the proxy server and the origin media server is not available, the available end-to-end bandwidth between the proxy server and the origin server is below a first threshold, or a number of used reusable connections between the proxy server and the origin media server exceed a second threshold;
a control server network interface operably coupled to the processor, the control server network interface configured to send a query to a control server to locate an origin media server having the media content if the media content is cache-missing and to receive information from the control server regarding the origin media server having the media content; and
an origin media server network interface operably coupled to the processor, the origin media server network interface configured to forward the request for the media content to the origin media server having the media content using a reusable connection or a newly created connection in the connection pool between the proxy server and the origin media server if the connection pool between a proxy server and origin media server is available.

20. The proxy server of claim 19, wherein the processor is configured to determine whether to use a caching server to accommodate the request for the media content in accordance a bandwidth of a secondary reusable connection available between the caching server and the origin media server.

21. The proxy server of claim 19, wherein the control server network interface is configured to receive additional information regarding a caching server available to accommodate the request for media content.

22. The proxy server of claim 19, wherein the processor is configured to determine a number of the reusable connections within the connection pool and which of the reusable connections within the connection pool is currently in use.

23. The proxy server of claim 19, wherein a caching server network interface is configured to redirect the request for media content to a caching server if a bandwidth of the connection pool shared between the reusable connections is below a threshold.

24. A method for connection pooling in a content delivery network (CDN) by a control server, the method comprising:
receiving a query from a proxy server to locate an origin media server having media content requested by a user;
selecting a caching server from a plurality of caching servers according to a weighted sum of available end-to-end bandwidth between each caching server and an origin media server and according to a number of idle reusable connections in a connection pool between each caching server and the origin media server if the connection pool between the proxy server and the origin media server is not available, the available end-to-end bandwidth between the proxy server and the origin server is below a first threshold, or a number of used reusable connections between the proxy server and the origin media server exceed a second threshold; and
sending an indication of the selected caching server to the proxy server.

* * * * *